(12) United States Patent
Luo et al.

(10) Patent No.: US 11,865,943 B2
(45) Date of Patent: Jan. 9, 2024

(54) CHARGING METHOD FOR SECONDARY BATTERY, CHARGING APPARATUS FOR SECONDARY BATTERY, CHARGING DEVICE, AND COMPUTER STORAGE MEDIUM

(71) Applicant: CONTEMPORARY AMPEREX TECHNOLOGY CO., LIMITED, Ningde (CN)

(72) Inventors: Chenxu Luo, Ningde (CN); Jianfu He, Ningde (CN); Qian Liu, Ningde (CN); Yu Yan, Ningde (CN); Yonghuang Ye, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/182,841

(22) Filed: Mar. 13, 2023

(65) Prior Publication Data
US 2023/0211701 A1    Jul. 6, 2023

Related U.S. Application Data

(63) Continuation of application No. PCT/CN2022/089479, filed on Apr. 27, 2022.

(30) Foreign Application Priority Data

Oct. 29, 2021    (CN) .......................... 202111277631.4

(51) Int. Cl.
*H02J 7/00*    (2006.01)
*B60L 58/16*   (2019.01)
(Continued)

(52) U.S. Cl.
CPC ............... *B60L 58/16* (2019.02); *B60L 58/18* (2019.02); *B60L 58/24* (2019.02); *H01M 4/485* (2013.01);
(Continued)

(58) Field of Classification Search
CPC .......... B60L 58/16; B60L 58/18; B60L 58/24; B60L 2240/545; B60L 2240/547;
(Continued)

(56) References Cited

U.S. PATENT DOCUMENTS

2022/0299572 A1* 9/2022 Aoki ................. H01M 10/0562

FOREIGN PATENT DOCUMENTS

| CN | 102148410 A | 8/2011 |
| CN | 105655554 A | 6/2016 |

(Continued)

OTHER PUBLICATIONS

Korean Patent Intellectual Property Office Notice of Allowance For KR Application No. 10-2022-7031404 dated Jan. 18, 2023 6 Pages (Translation Included ).

(Continued)

*Primary Examiner* — Zixuan Zhou
(74) *Attorney, Agent, or Firm* — ANOVA LAW GROUP, PLLC

(57) ABSTRACT

A charging method for a secondary battery including a lithium-supplementing material. The method includes acquiring a first state of health of the secondary battery in response to the secondary battery being at a preset charging node, activating the lithium-supplementing material in response to the first state of health being less than or equal to a first threshold to supplement lithium for the secondary battery, performing a charging process on the secondary battery, determining a second state of health of the secondary battery based on a working parameter of the secondary
(Continued)

battery in the charging process, and charging the secondary battery in response to the second state of health being greater than a second threshold.

20 Claims, 5 Drawing Sheets

(51) Int. Cl.
*B60L 58/18* (2019.01)
*B60L 58/24* (2019.01)
*H01M 50/572* (2021.01)
*H01M 50/155* (2021.01)
*H01M 4/485* (2010.01)
*H01M 10/44* (2006.01)

(52) U.S. Cl.
CPC ......... *H01M 10/44* (2013.01); *H01M 50/155* (2021.01); *H01M 50/572* (2021.01); *B60L 2240/545* (2013.01); *B60L 2240/547* (2013.01)

(58) Field of Classification Search
CPC .. H01M 50/155; H01M 50/572; H01M 4/485; H01M 10/44
USPC .......................................................... 320/127
See application file for complete search history.

(56) References Cited

FOREIGN PATENT DOCUMENTS

| CN | 108539124 A | 9/2018 |
|---|---|---|
| CN | 110112479 A | 8/2019 |
| CN | 107221650 B | 10/2019 |
| CN | 112701277 A | 4/2021 |
| CN | 113258147 A | 8/2021 |
| CN | 113540591 A | 10/2021 |
| KR | 20200007668 A | 1/2020 |
| KR | 20210049709 A | 5/2021 |
| KR | 20210074001 A | 6/2021 |
| WO | 2021100247 A1 | 5/2021 |

OTHER PUBLICATIONS

Korean Patent Intellectual Property Office Request for the Submission of an Opinion For KR Application No. 10-2022-7031404 dated Sep. 22, 2022 8 Pages (Translation Included ).
The World Intellectual Property Organization (WIPO) International Search Report and Written Opinion for PCT/CN2022/089479 dated May 30, 2022 16 pages (including translation).
The China National Intellectual Property Administration (CNIPA) The First Office Action for Chinese Application 202111277631.4 dated Sep. 28, 2023 12 Pages (With Translation).
The European Patent Office (EPO) Extended Search Report for EP Application No. 22764288.1, dated Sep. 26, 2023 6 Pages.

* cited by examiner

CHARGING METHOD FOR SECONDARY BATTERY, CHARGING APPARATUS FOR SECONDARY BATTERY, CHARGING DEVICE, AND COMPUTER STORAGE MEDIUM

CROSS-REFERENCE TO RELATED APPLICATIONS

The present application is a continuation of International Application No. PCT/CN2022/089479, filed on Apr. 27, 2022, which claims priority to Chinese Patent Application No. 202111277631.4 titled "CHARGING METHOD FOR SECONDARY BATTERY, CHARGING APPARATUS FOR SECONDARY BATTERY, CHARGING DEVICE, AND COMPUTER STORAGE MEDIUM" filed on Oct. 29, 2021, the entire contents of both of which are incorporated herein by reference.

TECHNICAL FIELD

The present application relates to the technical field of batteries, and specifically relates to a charging method for a secondary battery, a charging apparatus for a secondary battery, a charging device, and a computer storage medium.

BACKGROUND ART

In recent years, with the application and promotion of secondary batteries in industries, such as various electronic products and new energy vehicles, their energy density has attracted more and more attention. However, in a first charging process of a secondary battery, a solid electrolyte interface (SEI) film is inevitably formed on the surface of a negative electrode active material, thereby resulting in irreversible consumption of active ions, making it difficult to eliminate the irreversible capacity loss of the secondary battery, and bringing challenges to the improvement of the energy density of the secondary battery.

SUMMARY

Examples of the present application provide a method for a secondary battery, an apparatus for a secondary battery, a device, and a computer storage medium, which can supplement lithium for the secondary battery in a cycling process.

In a first aspect, an example of the present application provides a charging method for a secondary battery, the secondary battery comprising a lithium-supplementing material. The method includes: acquiring a first state of health $SOH_1$ of the secondary battery when the secondary battery is at a preset charging node; activating the lithium-supplementing material when the $SOH_1$ is less than or equal to a first threshold, to supplement lithium for the secondary battery; performing a first charging process on the secondary battery; determining a second state of health $SOH_2$ of the secondary battery based on a working parameter of the secondary battery in the first charging process; and charging the secondary battery when the $SOH_2$ is greater than a second threshold.

The above technical solution detects the State Of Health (SOH) of the secondary battery when the secondary battery is at the preset charging node, post-supplements lithium for the secondary battery when the SOH is low, and performs a normal charge-discharge cycle when the active lithium content of the secondary battery after post-supplement of lithium is up to standard, thereby determining the active lithium loss of the secondary battery in time, effectively supplementing active lithium, extending the cycle life of the secondary battery, and improving the energy density of the secondary battery. In addition, in the example of the present application, lithium is post-supplemented for the secondary battery, thereby avoiding a series of problems such as phase transition of the material on the material surface of the positive and negative electrode sheets, increase of Directive Current Resistance (DCR), and gas generation from the decomposition of the electrolyte solution, and improving the cycling performance and the rate performance of the secondary battery.

In some possible examples, the method further includes: determining that the secondary battery is at a next charging node of the preset charging node when the $SOH_2$ is less than or equal to the second threshold; and activating the lithium-supplementing material to supplement lithium for the secondary battery.

According to the above technical solution, when the lithium supplement effect does not meet the work needs of the secondary battery, lithium is re-supplemented for the secondary battery, thereby maintaining the active lithium content in the secondary battery within a relatively high range, extending the cycle life of the secondary battery, and improving the energy density of the secondary battery.

In some possible examples, the activating the lithium-supplementing material to supplement lithium for the secondary battery includes: setting an overcharge protection voltage as a lithium-supplementing voltage, where the lithium-supplementing voltage is a charging cut-off voltage corresponding to a charging node where the secondary battery is located; charging the secondary battery to the lithium-supplementing voltage at a preset first rate constant current; charging the secondary battery to a preset first charging cut-off current at a constant voltage of the lithium-supplementing voltage; and discharging the second battery to a preset first cut-off voltage at a preset second rate constant current.

The activation of the lithium-supplementing material is implemented by the above approach, thereby avoiding the reduction of the electrochemical performance of the secondary battery, whilst supplementing active lithium for the secondary battery.

In some possible examples, after the setting the overcharge protection voltage as the lithium-supplementing voltage, the method further includes: heating the secondary battery to a first temperature. Before the performing the first charging process on the secondary battery, the method further includes: controlling a temperature of the secondary battery as a second temperature.

According to the above technical solution, the secondary battery is heated before lithium supplement, and is cycled at a low temperature after lithium supplement, thereby reducing the capacity loss caused by the battery polarization in the lithium supplementing process, releasing more active lithium from the lithium-supplementing material, and accelerating the lithium supplementing speed.

In some possible examples, the first temperature is from 25° C. to 60° C., and the second temperature is from 20° C. to 30° C.

The first temperature and the second temperature are controlled within an appropriate range, thereby further improving the lithium supplementing efficiency and guaranteeing the electrochemical performance of the secondary battery.

In some possible examples, the first charging process includes: discharging the second battery to a preset second cut-off voltage at a preset third rate constant current; charging the secondary battery to the first cut-off voltage at a preset fourth rate constant current; charging the secondary battery to a preset second charging cut-off current at a constant voltage of the first cut-off voltage; and discharging the second battery to the second cut-off voltage at the preset third rate constant current.

In the above technical solution, the performing the first charging process on the secondary battery can facilitate acquiring charging parameters of the secondary battery, thereby determining the lithium supplementing effect.

In some possible examples, the first rate is from 0.1 C to 1 C.

In some possible examples, the first rate is from 0.1 C to 0.5 C.

The first rate within an appropriate range can fully and uniformly deintercalate active lithium from an electrode material, and can increase the lithium stock at the negative electrode.

In some possible examples, the charging the secondary battery when the $SOH_2$ is greater than the second threshold includes: cyclically executing the following steps on the secondary battery when the $SOH_2$ is greater than the second threshold, until satisfying a preset stop condition: charging the secondary battery to the first cut-off voltage at the preset fourth rate constant current; charging the secondary battery to the preset second charging cut-off current at the constant voltage of the first cut-off voltage; and discharging the second battery to the second cut-off voltage at the preset third rate constant current, where the preset stop condition includes: the number of times of discharging the secondary battery to the second cut-off voltage reaches a preset threshold of number of times, or the secondary battery is at the preset charging node.

In the above technical solution, the normal charge-discharge cycle may be performed when the active lithium content is sufficient, thereby guaranteeing the cycling performance of the secondary battery.

In some possible examples, the method further includes: setting N charging nodes and a plurality of the first thresholds in such a way that there is one-to-one correspondence between each of the charging nodes and the plurality of the first thresholds based on the number of cycles and a cycling capacity of the secondary battery, where N≥2; setting a plurality of the second thresholds in such a way that there is one-to-one correspondence between the N charging nodes and the plurality of the second thresholds; and setting a plurality of the charging cut-off voltages in such a way that there is one-to-one correspondence between the N charging nodes and the plurality of the charging cut-off voltages, based on the second threshold.

In the above technical solution, the state of health of the secondary battery can be monitored at each charging node, thereby supplementing active lithium in time, and further guaranteeing the energy density and the cycle life of the battery.

In some possible examples, the charging cut-off voltage is from 4.4 V to 4.8 V.

When the charging cut-off voltage is within the above appropriate range, the lithium-supplementing material can be better activated for lithium supplement.

In some possible examples, the lithium-supplementing material has a molecular formula of $Li_{1+x}M_yO_z$, where element M is selected from at least one of Ni or Co and at least one of Mn, Mo, Ru, or Ti; where $0.05 \leq x \leq 0.5$, $0.10 \leq y \leq 0.95$, and $2 \leq z \leq 4$; and a mass proportion w of the lithium-supplementing material satisfies: $0 \leq w \leq 0.35$ based on a total mass of a positive electrode sheet in the secondary battery.

The composition and the content of the lithium-supplementing material within the above appropriate range can further extend the cycle life of the secondary battery, and guarantee the energy density of the secondary battery.

In some possible examples, an initial coulombic efficiency e of the lithium-supplementing material satisfies: $0.2 \leq e \leq 0.9$.

The initial coulombic efficiency within the above appropriate range can reduce the irreversible capacity loss of the secondary battery during the first charge-discharge, thereby improving the cycling performance and the energy density of the secondary battery.

In some possible examples, in the secondary battery, a ratio C.B. of a charging capacity of a negative electrode active material to a charging capacity of a positive electrode active material satisfies $1.05 \leq C.B. \leq 1.15$.

Controlling the ratio C.B. of the charging capacity of the negative electrode active material to the charging capacity of the positive electrode active material within an appropriate range can improve the energy density of the secondary battery and reduce the manufacturing costs of the secondary battery, whilst guaranteeing the cycling performance of the secondary battery.

In some possible examples, the secondary battery has a gas-permeable top cover.

The secondary battery having the gas-permeable top cover can immediately discharge the gas generated in the lithium supplementing and cycling processes of the secondary battery, thereby avoiding the potential safety hazard, such as battery expansion.

In a second aspect, an example of the present application provides a charging apparatus for a secondary battery, the secondary battery comprising a lithium-supplementing material. The apparatus includes: an acquiring module configured to acquire a first state of health $SOH_1$ of the secondary battery when the secondary battery is at a preset charging node; a processing module configured to activate the lithium-supplementing material when the $SOH_1$ is less than or equal to a first threshold, to supplement lithium for the secondary battery; a first charging module configured to perform a first charging process on the secondary battery; a first determining module configured to determine a second state of health $SOH_2$ of the secondary battery based on a working parameter of the secondary battery in the first charging process; and a second charging module configured to charge the secondary battery when the $SOH_2$ is greater than a second threshold.

In a third aspect, an example of the present application provides a charging device. The device includes: a processor and a memory storing computer program instructions; where the processor, when executing the computer program instructions, implements the charging method provided in any one example in the first aspect of the present application.

In a fourth aspect, an example of the present application provides a computer storage medium, where the computer storage medium stores computer program instructions, and the computer program instructions, when executed by a processor, implement the charging method provided in any one example in the first aspect of the present application.

DESCRIPTION OF DRAWINGS

To more clearly describe the technical solutions in examples of the present application, the accompanying drawings to be used in the examples of the present application will be briefly introduced below. For those of ordinary skills in the art, other drawings may also be obtained based on these drawings without making creative work.

DETAILED DESCRIPTION

Figure 1:
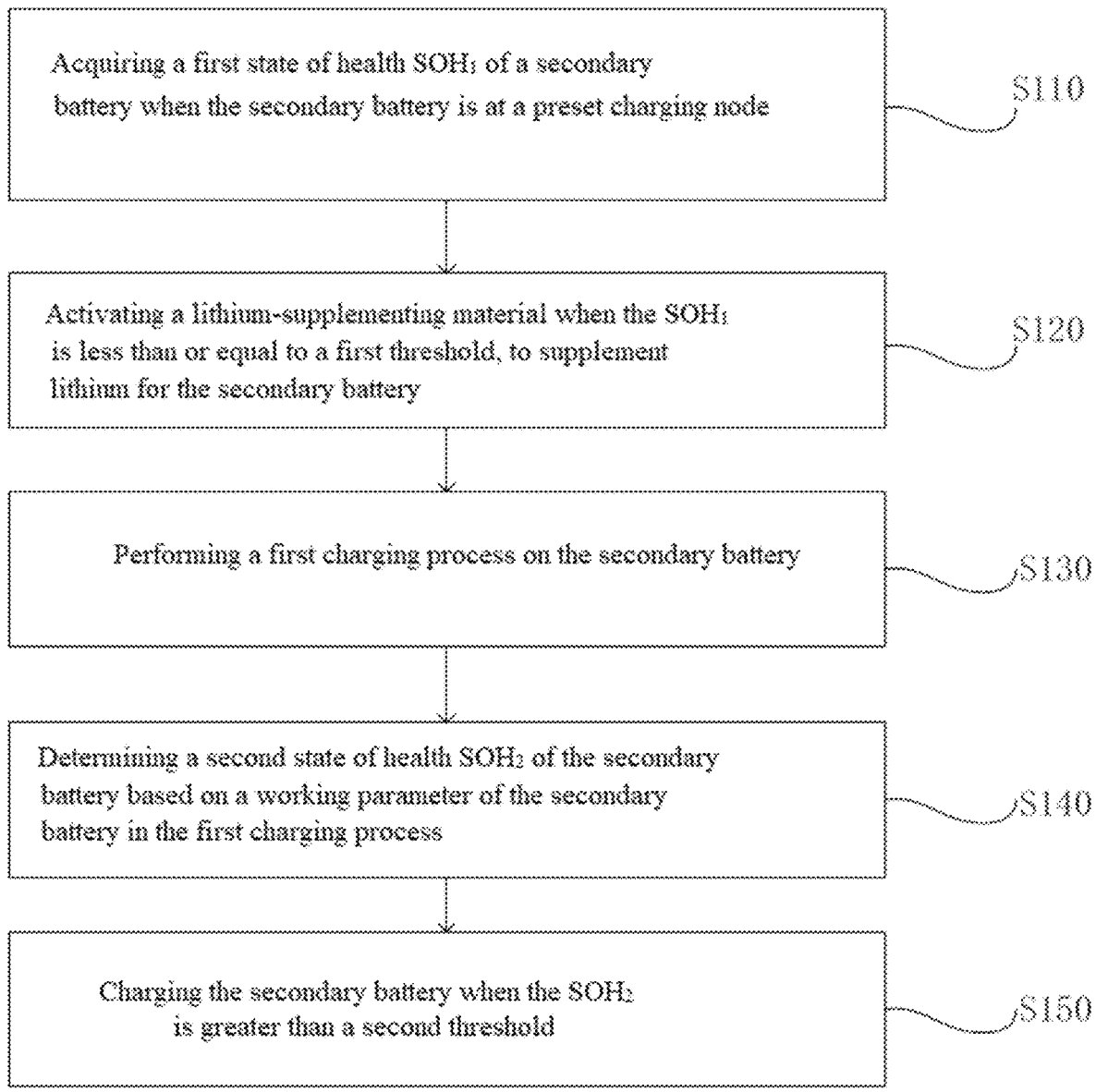
FIG. 1 is a schematic flowchart of a charging method provided in an example of the present application.

Examples of the technical solutions of the present application will be described in detail below with reference to the accompanying drawings. The following examples are merely used to more clearly describe the technical solutions of the present application, are therefore only used as examples, and cannot be used to limit the scope of protection of the present application.

Unless otherwise defined, all technical and scientific terms used herein have the same meanings as commonly understood those skilled in the technical field of the present application. The terms used herein are intended only to describe specific examples and are not intended to limit the present application. The terms "comprise" and "have" and any variations thereof in the specification and claims of the present application and the brief description of the drawings are intended to cover non-exclusive inclusion.

In the description of the examples of the present application, the technical terms "first", "second", etc. are only used to distinguish different objects, and cannot be understood as indicating or implying relative importance or implicitly indicating the number, specific order, or primary-secondary relationship of the indicated technical features. In the description of the examples of the present application, "a plurality of" means two or more, unless otherwise explicitly and specifically defined.

The "examples" mentioned herein means that particular features, structures or characteristics described with reference to the examples may be included in at least one example of the present application. The phrase appearing at various positions of the specification neither always refers to the same example, nor refers to separate or alternative examples that are mutually exclusive with other examples. It is explicitly and implicitly understood by those skilled in the art that the examples described herein may be combined with other examples.

In the description of the examples of the present application, the term "and/or" is only an association relationship for describing associated objects, indicating that three relationships may exist. For example, A and/or B indicates that there are three cases of A alone, A and B together, and B alone. In addition, the character "/" herein generally means that associated objects before and after it are in an "or" relationship.

In the description of the examples of the present application, the term "a plurality of" refers to two or more (including two). Similarly, "a plurality of groups" refers to two or more groups (including two groups), and "a plurality of pieces" refers to two or more pieces (including two pieces).

In the description of the examples of the present application, the orientation or position relationship indicated by the technical terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are intended to facilitate the description of the examples of the present application and simplify the description only, rather than indicating or implying that the device or element referred to must have a particular orientation or be constructed and operated in a particular orientation, and therefore are not to be interpreted as limitations on the examples of the present application.

In the description of the examples of the present application, unless otherwise expressly specified and limited, the technical terms "mount", "join", "connect", "fix", etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the examples of the present application can be understood on a case-by-case basis.

In order to meet the requirements of secondary batteries for high energy density, the active lithium content may be increased using a lithium supplementing technology, to compensate for the active lithium loss of the secondary battery in the first charging process. At present, the main lithium supplementing process with high technical maturity is to directly add lithium strip or lithium powder to the negative electrode, or add a lithium-rich material (such as lithium-rich transition metal oxides) to the positive electrode sheet to increase additional active lithium. During the chemical formation or the first charging process of the battery, such active lithium is deintercalated from the lithium-rich material to compensate for the active lithium loss caused by the formation of the SEI film on the negative electrode active material.

The inventor found through researches that because the materials are pre-lithiated before chemical formation of the battery or lithium is supplemented for the secondary battery during the first charging and chemical formation in relevant lithium supplementing process, a large amount of the lithium-rich material is deintercalated from the active lithium during the first cycle, such that excess negative electrode active material is required to provide intercalation sites for the active lithium. Further, due to the low initial coulombic efficiency, such excess negative electrode active material cannot participate in the lithium deintercalation process in subsequent cycles, thereby decreasing the energy density of the secondary battery to some extent. In addition, high-voltage charging is usually required to supplement lithium for the secondary battery during chemical formation or first charging of the battery, thereby resulting in a series of problems, such as phase transition on the surface of the positive and negative electrode sheets, gas generation from the decomposition of the electrolyte solution, and large DCR. These problems will also tend to be serious with the increase of the number of cycles.

In order to solve the related technical problems, the inventor found after thorough consideration that lithium supplement in the cycling process of the secondary battery can greatly make up for the defects of the lithium supplementing technology.

Figure 6A:
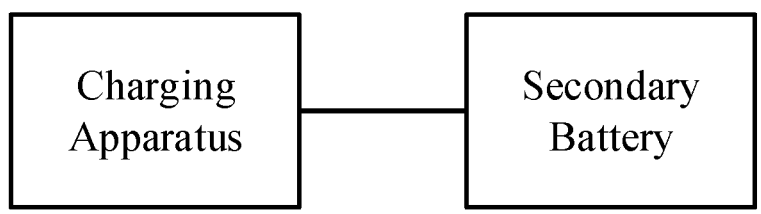
FIG. 6A is a schematic structural diagram showing a charging apparatus and a secondary battery provided in an example of the present application.
Figure 6B:
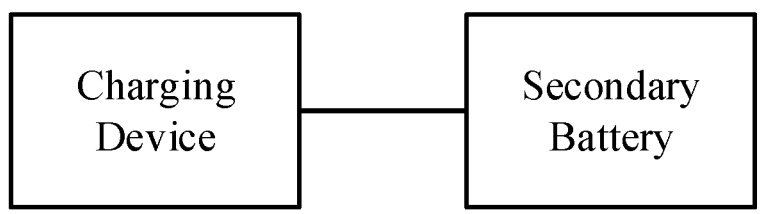
FIG. 6B is a schematic structural diagram showing a charging device and a secondary battery provided in an example of the present application.

On this basis, examples of the present application provide a charging method for a secondary battery, a charging apparatus for a secondary battery, a charging device, and a computer storage medium. FIG. 6A is an example schematic structural diagram showing a charging apparatus and a secondary battery. The charging apparatus can be any charging apparatus consistent with the disclosure, such as charging apparatus 200 described below. FIG. 6B is an example schematic structural diagram showing a charging device and a secondary battery. The charging device can be any charging device consistent with the disclosure, such as the charging device described below with reference to FIG. 3. The charging method for a secondary battery provided in an example of the present application is first introduced below.

FIG. 1 shows a schematic flowchart of a charging method for a secondary battery provided in an example of the present application, where the secondary battery comprises a lithium-supplementing material. In the secondary battery, the lithium-supplementing material may be a positive electrode lithium-supplementing material to be added to a positive electrode sheet. As show in FIG. 1, the charging method for a secondary battery specifically may include the following steps (from S110 to S150).

S110: acquiring a first state of health $SOH_1$ of a secondary battery when the secondary battery is at a preset charging node.

S120: activating a lithium-supplementing material when the $SOH_1$ is less than or equal to a first threshold, to supplement lithium for the secondary battery.

S130: performing a first charging process on the secondary battery.

S140: determining a second state of health $SOH_2$ of the secondary battery based on a working parameter of the secondary battery in the first charging process.

S150: charging the secondary battery when the $SOH_2$ is greater than a second threshold.

In step S110, the preset charging node may be any one charging node among at least two charging nodes arranged based on experimental data, such as the cycle life or the capacity fade of the secondary battery. Specifically, the preset charging node may be a time node or a cycle number node with much active lithium loss predicted based on the above experimental data.

$SOH_1$ may represent a remaining battery life SOH of the secondary battery at a current moment, and has a well-known meaning in the art. Specifically, the SOH may also be defined based on the Cycle Life or based on the Capacity Fade.

In step S120, the first threshold may be a preset SOH used for measuring the degree of the active lithium loss of the secondary battery. When the $SOH_1$ is less than or equal to the first threshold, the secondary battery may be regarded to be in a state in which the active lithium is required to be supplemented. In this case, the lithium-supplementing material may be activated to supplement lithium for the secondary battery. The lithium-supplementing material may be activated by various means. For example, the lithium-supplementing material may be activated by, e.g., increasing the charging voltage or charging rate, or increasing the temperature, or may be activated by charge-discharge at a certain voltage or rate. In an example, when the $SOH_1$ is less than or equal to the first threshold, a prompt signal may also be sent to a user to prompt the user that the secondary battery is in a state in which the active lithium is required to be supplemented.

In step S130, the first charging process may be charging and discharging the secondary battery based on parameters of a normal charge-discharge cycle.

In steps S140 and S150, the $SOH_2$ may represent the remaining battery life SOH after supplementing lithium for the secondary battery, and has a similar meaning to the $SOH_1$. The second threshold may be a preset SOH used for measuring whether the active lithium content of the secondary battery is up to standard. When the $SOH_2$ is greater than the second threshold, the secondary battery may be regarded as that after lithium supplement, the lost active lithium has been fully supplemented, and the active lithium content in the secondary battery can meet the work needs. In this case, the lithium supplement may be regarded as completed, and the normal charge-discharge cycle may be performed on the secondary battery.

In the example of the present application, the SOH of the secondary battery is detected when the secondary battery is at the preset charging node, lithium is post-supplemented for the secondary battery when the SOH is low, and the normal charge-discharge cycle is performed when the active lithium content of the secondary battery after post-supplement of lithium is up to standard, thereby determining the active lithium loss of the secondary battery in time, effectively supplementing active lithium, extending the cycle life of the secondary battery, and improving the energy density of the secondary battery. In addition, in the example of the present application, lithium is post-supplemented for the secondary battery, thereby avoiding a series of problems such as phase transition of the material on the surface of the positive and negative electrode sheets, increase of DCR, and gas generation from the decomposition of the electrolyte solution, and improving the cycling performance and the rate performance of the secondary battery.

In some examples, the method may further include: determining that the secondary battery is at a next charging node of the preset charging node when the $SOH_2$ is less than or equal to the second threshold; and activating the lithium-supplementing material to supplement lithium for the secondary battery.

When the $SOH_2$ is less than or equal to the second threshold, the secondary battery may be regarded as that after lithium supplement, the active lithium content still fails to meet the work needs of the secondary battery. In this case, the secondary battery may enter the next charging node, and be re-supplemented with lithium. Thus, whether the state of the secondary battery can meet the work needs can be determined based on the active lithium content of the secondary battery after lithium supplement, and when the state of the secondary battery cannot meet the work needs, the secondary battery is re-supplemented with lithium. Thus, the active lithium content in the secondary can be maintained in a high range, thereby extending the cycle life of the secondary battery, and improving the energy density of the secondary battery.

In some examples, the activating the lithium-supplementing material to supplement lithium for the secondary battery specifically may include: setting an overcharge protection voltage as a lithium-supplementing voltage, where the lithium-supplementing voltage is a charging cut-off voltage corresponding to a charging node where the secondary battery is located; charging the secondary battery to the lithium-supplementing voltage at a preset first rate constant current (a constant current of a preset first rate); charging the secondary battery to a preset first charging cut-off current at a constant voltage of the lithium-supplementing voltage; and discharging the second battery to a preset first cut-off voltage at a preset second rate constant current (a constant current of a preset second rate).

The overcharge protection voltage may be understood as: a maximum value of the charging voltage set to guarantee the safety performance of the secondary battery. When the charging voltage is greater than the overcharge protection voltage, the charging circuit will be disconnected.

The lithium-supplementing voltage may be understood as a charging cut-off voltage to be reached for activating the lithium-supplementing material. The size of the charging cut-off voltage may be set based on the charging node, and the charging cut-off voltage is generally higher than a charging cut-off voltage in the normal charge-discharge cycle of the secondary battery. In an example, the charging cut-off voltage may be from 4.4 V to 4.8 V, from 4.4 V to 4.7 V, or from 4.5 V to 4.7 V. The size of the charging cut-off voltage within an appropriate range can achieve both favorable safety and high lithium supplementing efficiency of the lithium supplementing process.

When the secondary battery is at different charging nodes, corresponding charging cut-off voltages may be the same, or may be different. In an example, the charging cut-off voltages corresponding to the charging nodes may be increased with the increase of the number of cycles corresponding to the charging nodes. This is equivalent to dividing the high-voltage charging process for pre-supplementing lithium into a plurality of lithium post-supplementing processes, such that an electrode material obtains buffer time and space for releasing the surface stress and restoring the structure. Thus, the stability of the surface structure of the positive and negative electrode sheets can be improved, thereby improving the electrochemical performance of the secondary battery, such as the initial capacity and the initial coulombic efficiency.

The first rate and the second rate may be preset small charging rate and discharging rate. The first rate and the second rate may be the same or may be different. For example, the first rate and the second rate may each independently be selected from 0.1 C to 1 C, or may each independently be selected from 0.1 C to 0.5 C. Specifically, the first rate and the second rate may each independently be 0.1 C, 0.2 C, 0.33 C, 0.5 C, or 1 C. In the process of activating the lithium-supplementing material to supplement lithium for the secondary battery, controlling the charge-discharge rate within an appropriate and small range can make the active lithium be fully and uniformly deintercalated from the electrode material, thereby reducing the transition metal migration and the phase transition degree on the surface of the material, increasing the lithium stock at the negative electrode, supplementing more active lithium, and further improving the energy density and the cycling performance of the secondary battery.

The first charging cut-off current may be a charging cut-off current set based on properties of the electrode material and the lithium-supplementing material in the secondary battery, and may be, e.g., 0.05 C, 0.04 C, or 0.02 C. The first cut-off voltage may be the charging cut-off voltage in the normal cycle.

In this example, charging is performed at a small rate and a high voltage, and discharging is performed at a small rate, thereby activating the lithium-supplementing material, supplementing lithium for the secondary battery, avoiding the problems, such as phase transition of the material on the surface of the positive and negative electrode sheets, gas generation from the decomposition of the electrolyte solution, and increase of DCR, whilst supplementing the active lithium, and further guaranteeing that the secondary battery has high energy density, long cycle life, good cycling performance and rate performance.

In some examples, after the setting the overcharge protection voltage as the lithium-supplementing voltage, the method may further include: heating the secondary battery to a first temperature. Before the performing the first charging process on the secondary battery, the method may further include: controlling a temperature of the secondary battery as a second temperature.

The first temperature may be from 25° C. to 60° C., from 30° C. to 55° C., from 35° C. to 50° C., or from 40° C. to 45° C. Specifically, the first temperature may be 25° C., 35° C., 45° C., or 55° C. The second temperature may be a temperature, e.g., from 20° C. to 30° C., in the normal charge-discharge cycle of the secondary battery. It is easily understood that the second temperature may be lower than the first temperature. The first temperature within an appropriate range can reduce the capacity loss caused by the battery polarization in the lithium supplementing process, release more active lithium from the lithium-supplementing material, and accelerate the lithium supplementing speed. The second temperature within an appropriate range can guarantee the cycling performance and the rate performance of the secondary battery.

In this example, before the activating the lithium-supplementing material to supplement lithium for the secondary battery, the temperature of the secondary battery is increased, thereby reducing the capacity loss caused by the battery polarization in the lithium supplementing process, releasing more active lithium from the lithium-supplementing material, and accelerating the lithium supplementing speed. Thus, the lithium supplementing efficiency is improved, thereby improving the energy density and the cycling performance of the secondary battery.

In some examples, the first charging process may include: discharging the second battery to a preset second cut-off voltage at a preset third rate constant current (a constant current of a preset third rate); charging the secondary battery to the first cut-off voltage at a preset fourth rate constant current (a constant current of a preset third rate); charging the secondary battery to a preset second charging cut-off current at a constant voltage of the first cut-off voltage; and discharging the second battery to the second cut-off voltage at the preset third rate constant current.

In the first charging process, the secondary battery can operate at the charge-discharge rate and the charge-discharge cut-off voltage in the normal cycling process. The third rate may be from 0.2 C to 1 C. The second cut-off voltage may be the charging cut-off voltage corresponding to the normal cycling process of the secondary battery. The fourth rate may be from 0.2 C to 1 C. The second charging cut-off current may be a charging cut-off current corresponding to the normal cycling process of the secondary battery, and specifically, the second charging cut-off current may be from 0 C to 0.05 C.

In this example, the secondary battery operates at the charge-discharge rate and the charge-discharge cut-off voltage in the normal cycling process after lithium supplement.

Thus, the SOH in the normal cycling process of the secondary battery can be determined based on the working parameter of the secondary battery in the first charging process, thereby determining whether the active lithium content in the secondary battery after lithium supplement can meet the work needs, and further facilitating determining the lithium supplementing process of the secondary battery.

In some examples, the charging the secondary battery when the $SOH_2$ is greater than the second threshold specifically may include: cyclically executing the following steps on the secondary battery when the $SOH_2$ is greater than the second threshold, until satisfying a preset stop condition: charging the secondary battery to the first cut-off voltage at the preset fourth rate constant current; charging the secondary battery to the preset second charging cut-off current at the constant voltage of the first cut-off voltage; and discharging the second battery to the second cut-off voltage at the preset third rate constant current. The preset stop condition may include: the number of times of discharging the secondary battery to the second cut-off voltage reaches a preset threshold of number of times, or the secondary battery is at the preset charging node.

In this example, when the active lithium content in the secondary battery can meet the work needs after lithium supplement, the normal charge-discharge cycle may be performed until the service life of the secondary battery is ended, or until it is necessary to supplement the activity lithium for the secondary battery, such that the secondary battery can quickly enter a normal working state after the amount of supplemented lithium is up to standard, thereby guaranteeing the cycling performance of the secondary battery.

In some examples, the method may further include: setting N charging nodes and a plurality of the first thresholds in such a way that there is one-to-one correspondence between each of the charging nodes and the plurality of the first thresholds based on the number of cycles and a cycling capacity of the secondary battery, where N≥2; setting a plurality of the second thresholds in such a way that there is one-to-one correspondence between the N charging nodes and the plurality of the second thresholds; and setting a plurality of the charging cut-off voltages in such a way that there is one-to-one correspondence between the N charging nodes and the plurality of the charging cut-off voltages, based on the second threshold.

Figure 5:
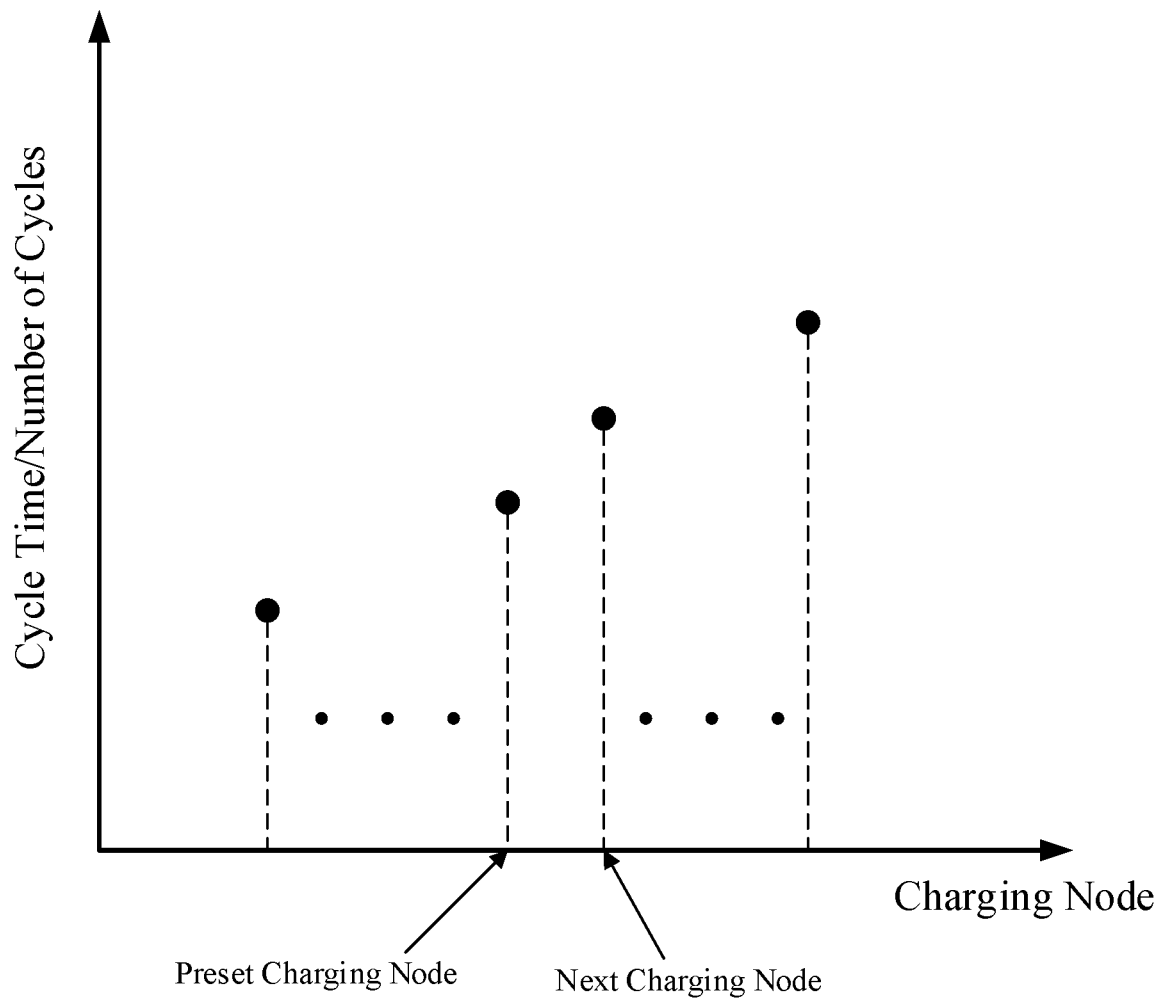
FIG. 5 is a graph showing charging nodes with different cycle times or numbers of cycles provided in an example of the present application.

The N charging nodes may be any one charging node among at least two charging nodes arranged based on experimental data, such as the cycle life or the capacity fade of the secondary battery. Specifically, the charging node may be a time node or a cycle number node with much active lithium loss predicted based on the above experimental data. FIG. 5 is an example graph showing charging nodes with different cycle times or numbers of cycles. It is easily understood that, among the N charging nodes, each charging node corresponds to different cycle time or numbers of cycles, and also corresponds to different first threshold and second threshold. With the increase of the cycle time or the number of cycles, the first threshold and the second threshold corresponding to the charging node may gradually decrease. Similarly, with the increase of the cycle time or the number of cycles, the voltage required to activate the lithium-supplementing material will change accordingly. Specifically, a charging cut-off voltage corresponding to each charging node may be set based on the active lithium content to be reached at different charging nodes of the secondary battery, e.g., the second threshold.

In this example, 2 or more than 2 charging nodes may be preset, and a state of health of the secondary battery may be monitored at each charging node, thereby supplementing the active lithium in time, and further guaranteeing the energy density and the cycle life of the battery.

In some examples, the lithium-supplementing material may have a molecular formula of $Li_{1+x}M_yO_z$, where element M may be selected from at least one of Ni or Co and at least one of Mn, Mo, Ru, or Ti, where 0.05≤x≤0.5, optionally, 0.1≤x≤0.3, and more specifically, 0.15≤x≤0.25; 0.10<y≤0.95, optionally, 0.55≤y≤0.90, and more specifically, 0.65≤y≤0.85; and 2≤z≤4, optionally, 2≤z≤3, and more specifically, 2≤z≤2.5.

A mass proportion w of the lithium-supplementing material may satisfy: 0≤w≤0.35 based on a total mass of the positive electrode sheet in the secondary battery. Optionally, 0≤w≤0.25, 0.02≤w≤0.15, or 0.03≤w≤0.10.

The lithium-supplementing material in this example may be added to the positive electrode sheet of the secondary battery. The lithium-supplementing material has an appropriate active lithium content and an appropriate activation voltage, and can be activated in the battery cycling process, thereby supplementing the active lithium for the secondary battery. In addition, the inventor found that a very low addition amount of the lithium-supplementing material reduces the effect of improving the cycle life of the secondary battery to some extent, and a very high addition amount will reduce the energy density of the secondary battery. The mass proportion of the lithium-supplementing material in the positive electrode sheet within the above appropriate range can achieve both a long cycle life and a high energy density of the secondary battery, thereby further extending the cycle life of the secondary battery, and guaranteeing the energy density of the secondary battery.

In some examples, the initial coulombic efficiency e of the lithium-supplementing material may satisfy: 0.20≤e≤0.90, optionally 0.30≤e≤0.80, 0.40≤e≤0.75, 0.40≤e≤0.65, or 0.50≤e≤0.65.

In this example, the initial coulombic efficiency of the lithium-supplementing material may be controlled by various means. For example, the initial coulombic efficiency may be regulated by, e.g., regulating the composition, crystal phase, and preparation process of the lithium-supplementing material, and the looseness of the lithium-supplementing material particles. Any approach that can make the initial coulombic efficiency of the lithium-supplementing material be within the above appropriate range may be adopted. This is not limited in the present application. Thus, the irreversible capacity loss of the secondary battery during the first charge-discharge can be reduced, thereby improving the cycling performance and energy density of the secondary battery.

By controlling the composition, mass proportion, and initial coulombic efficiency of the lithium-supplementing material, the lithium stock at the positive electrode relative to the negative electrode may satisfy: 0.01≤lithium stock≤0.99, 0.05≤lithium stock≤0.60, and 0.09≤lithium stock≤0.3, thereby significantly improving the effect of improving the service life of the secondary battery and guaranteeing the energy density of the secondary battery.

In some examples, in the secondary battery, a ratio C.B. of a charging capacity of a negative electrode active material to a charging capacity of a positive electrode active material may satisfy: 1.05≤C.B.≤1.15, 1.1≤C.B.≤1.15, or 1.1≤C.B.≤1.13.

In the pre-lithiation technology for lithium supplement, considering that the activation of the lithium-rich phase in the lithium-supplementing material during the first charging and the charging of the positive electrode active material in a wider range bring more charging capacity, excess negative electrode active material will usually be used to match the positive electrode capacity, and such excess negative electrode active material cannot be utilized in subsequent cycling processes, thereby decreasing the energy density. The present application supplements lithium by post-supplementing lithium, and can make full use of lithium deintercalation sites of the negative electrode active material corresponding to a hidden Depth of Discharge (DOD), such as lithium deintercalation sites of the negative electrode active material corresponding to 0 to 5% or 95 to 100% DOD, when supplementing lithium in the cycling process. Further, with the gradual increase of the active lithium loss during cycling, the negative electrode active material can provide a large number of lithium deintercalation sites. Thus, the content of the negative electrode active material may be designed based on the normal cycling capacity, and accordingly, it is not necessary to increase the use amount of the electrolyte solution.

For example, a first cycle charging capacity of the positive electrode in a cycling voltage interval is defined as Q, a first cycle charging capacity of the positive electrode in a lithium supplementing voltage interval is defined as R, and a first cycle charging specific capacity of the negative electrode is defined as P. In the pre-lithiation technology for lithium supplement, when a secondary battery is designed, the required first cycle charging capacity of the negative electrode is C.B.*(Q+R). The negative electrode is designed based on the normal cycling capacity, and the required first cycle charging capacity of the negative electrode is C.B.*Q. When the two designs have the same C.B. value, the present embodiment can save the use amount of the negative electrode active material by C.B.*R/P.

In this example, controlling the ratio C.B. of the charging capacity of the negative electrode active material to the charging capacity of the positive electrode active material within an appropriate range in the secondary battery can improve the energy density of the secondary battery and reduce the manufacturing costs of the secondary battery, whilst guaranteeing the cycling performance of the secondary battery.

In some examples, the secondary battery may have a gas-permeable top cover.

The secondary battery having the gas-permeable top cover can immediately discharge the gas generated in the lithium supplementing and cycling processes of the secondary battery, thereby avoiding the potential safety hazard, such as battery expansion.

Based on the same inventive concept, an example of the present application further provides a charging apparatus 200 for a secondary battery. The secondary battery includes a lithium-supplementing material. The description will be provided specifically with reference to FIG. 2.

Figure 2:
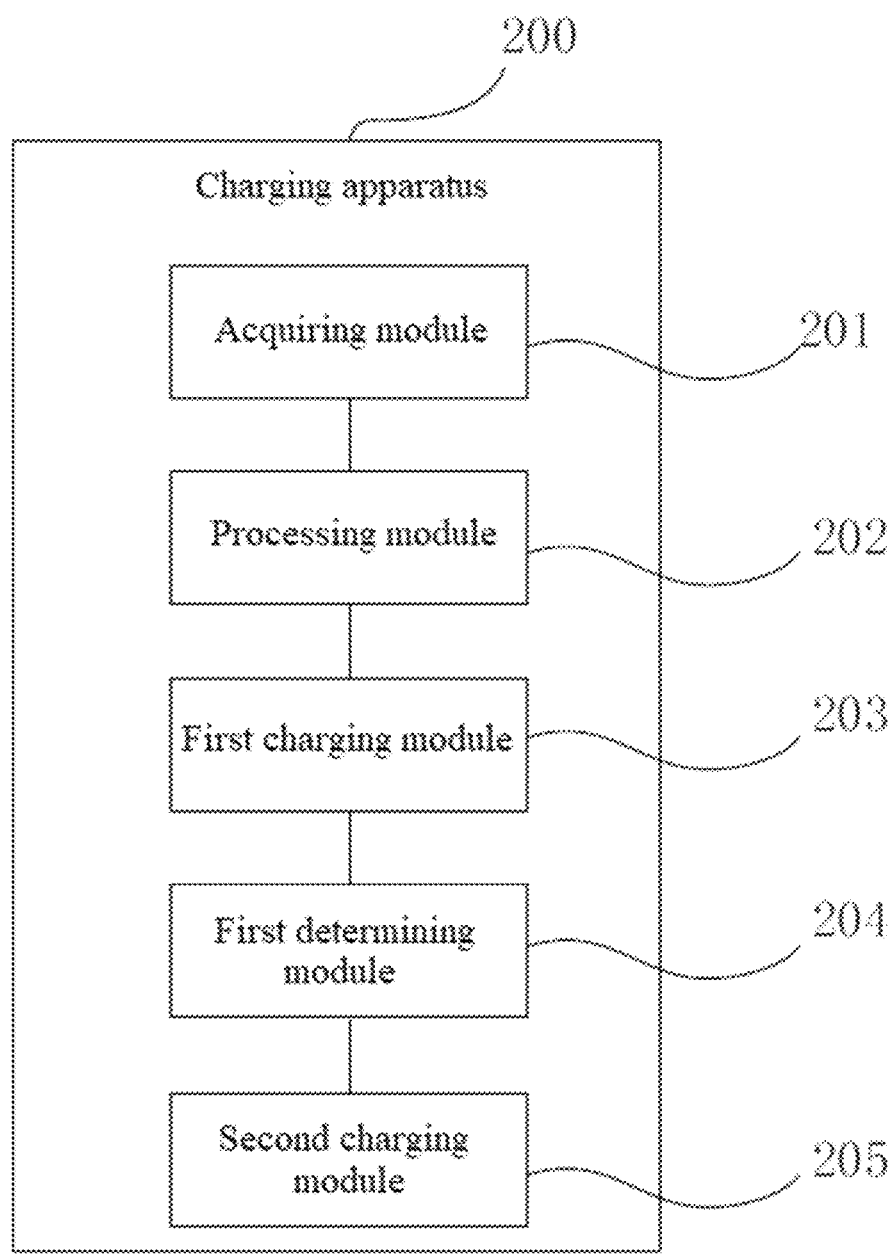
FIG. 2 is a schematic structural diagram of a charging apparatus provided in another example of the present application.

As shown in FIG. 2, the charging apparatus 200 may include an acquiring module 201, a processing module 202, a first charging module 203, a first determining module 204, and a second charging module 205.

The acquiring module 201 is configured to acquire a first state of health $SOH_1$ of the secondary battery when the secondary battery is at a preset charging node.

The processing module 202 is configured to activate the lithium-supplementing material when the $SOH_1$ is less than or equal to a first threshold, to supplement lithium for the secondary battery.

The first charging module 203 is configured to perform a first charging process on the secondary battery.

The first determining module 204 is configured to determine a second state of health $SOH_2$ of the secondary battery based on a working parameter of the secondary battery in the first charging process.

The second charging module 205 is configured to charge the secondary battery when the $SOH_2$ is greater than a second threshold.

In some examples, the charging apparatus 200 may further include: a second determining module configured to determine that the secondary battery is at a next charging node of the preset charging node when the $SOH_2$ is less than or equal to the second threshold. The processing module 202 is further configured to activate the lithium-supplementing material to supplement lithium for the secondary battery.

In some examples, the processing module 202 specifically may include: a setting submodule configured to set an overcharge protection voltage as a lithium-supplementing voltage, where the lithium-supplementing voltage is a charging cut-off voltage corresponding to a charging node where the secondary battery is located; a first constant current charging submodule configured to charge the secondary battery to the lithium-supplementing voltage at a preset first rate constant current; a first constant voltage charging submodule configured to charge the secondary battery to a preset first charging cut-off current at a constant voltage of the lithium-supplementing voltage; and a first constant current discharging submodule configured to discharge the second battery to a preset first cut-off voltage at a preset second rate constant current.

In some examples, the processing module 202 may further include: a heating submodule configured to heat the secondary battery to a first temperature; and a control submodule configured to control a temperature of the secondary battery as a second temperature.

In some examples, the first temperature may be from 25° C. to 60° C., from 30° C. to 55° C., from 35° C. to 50° C., or from 40° C. to 45° C. The second temperature may be from 20° C. to 30° C.

In some examples, the first charging module 203 specifically may include: a second constant current discharging submodule configured to discharge the second battery to a preset second cut-off voltage at a preset third rate constant current; a second constant current charging submodule configured to charge the secondary battery to the first cut-off voltage at a preset fourth rate constant current; a second constant voltage charging submodule configured to charge the secondary battery to a preset second charging cut-off current at a constant voltage of the first cut-off voltage; and a third constant current discharging submodule configured to discharge the second battery to the second cut-off voltage at the preset third rate constant current.

In some examples, the first rate may be from 0.1 C to 1 C.

In some examples, the first rate may be from 0.1 C to 0.5 C.

In some examples, the second charging module specifically may include: a processing submodule configured to cyclically execute the following steps on the secondary battery when the $SOH_2$ is greater than the second threshold, until satisfying a preset stop condition: charging the secondary battery to the first cut-off voltage at the preset fourth rate constant current; charging the secondary battery to the preset second charging cut-off current at the constant voltage of the first cut-off voltage; and discharging the second battery to the second cut-off voltage at the preset third rate constant current. The preset stop condition may include: the number of times of discharging the secondary battery to the second cut-off voltage reaches a preset threshold of number of times, or the secondary battery is at the preset charging node.

In some examples, the charging apparatus 200 may further include: a first setting module configured to set N charging nodes and a plurality of the first thresholds in such a way that there is one-to-one correspondence between each of the charging nodes and the plurality of the first thresholds based on the number of cycles and a cycling capacity of the secondary battery, where N≥2; a second setting module configured to set a plurality of the second thresholds in such a way that there is one-to-one correspondence between the N charging nodes and the plurality of the second thresholds; and a third setting module configured to set a plurality of the charging cut-off voltages in such a way that there is one-to-one correspondence between the N charging nodes and the plurality of the charging cut-off voltages, based on the second threshold.

In some examples, the charging cut-off voltage may be from 4.4 V to 4.8 V, from 4.4 V to 4.7 V, or from 4.5 V to 4.7 V.

In some examples, the lithium-supplementing material may have a molecular formula of $Li_{1+x}M_yO_z$, where element M may be selected from at least one of Ni or Co and one or more of Mn, Mo, Ru, or Ti, where $0.05 \leq x \leq 0.5$, optionally, $0.1 \leq x \leq 0.3$, and more specifically, $0.15 \leq x \leq 0.25$; $0.10 < y \leq 0.95$, optionally, $0.55 \leq y \leq 0.90$, and more specifically, $0.65 \leq y \leq 0.85$; and $2 \leq z \leq 4$, optionally, $2 \leq z \leq 3$, and more specifically, $2 \leq z \leq 2.5$.

A mass proportion w of the lithium-supplementing material may satisfy: $0 \leq w \leq 0.35$ based on a total mass of the positive electrode sheet in the secondary battery. Optionally, $0 \leq w \leq 0.25$, $0.02 \leq w \leq 0.15$, or $0.03 \leq w \leq 0.10$.

In some examples, the initial coulombic efficiency e of the lithium-supplementing material may satisfy: $0.20 \leq e \leq 0.90$, optionally $0.30 \leq e \leq 0.80$, $0.40 \leq e \leq 0.75$, $0.40 \leq e \leq 0.65$, or $0.50 \leq e \leq 0.65$.

In some examples, in the secondary battery, a ratio C.B. of a charging capacity of a negative electrode active material to a charging capacity of a positive electrode active material may satisfy: $1.05 \leq C.B. \leq 1.15$, $1.1 \leq C.B. \leq 1.15$, or $1.1 \leq C.B. \leq 1.13$.

In some examples, the secondary battery may have a gas-permeable top cover.

Therefore, the SOH of the secondary battery may be detected when the secondary battery is at the preset charging node, lithium may be post-supplemented for the secondary battery when the SOH is low, and the normal charge-discharge cycle may be performed when the active lithium content of the secondary battery after post-supplement of lithium is up to standard, thereby determining the active lithium loss of the secondary battery in time, effectively supplementing active lithium, extending the cycle life of the secondary battery, and improving the energy density of the secondary battery. In addition, in the example of the present application, lithium is post-supplemented for the secondary battery, thereby avoiding a series of problems such as phase transition of the material on the surface of the positive and negative electrode sheets, increase of DCR, and gas generation from the decomposition of the electrolyte solution, and improving the cycling performance and the rate performance of the secondary battery.

Based on the same inventive concept, an example of the present application further provides a charging device, which will be described in detail specifically with reference to FIG. 3.

Figure 3:
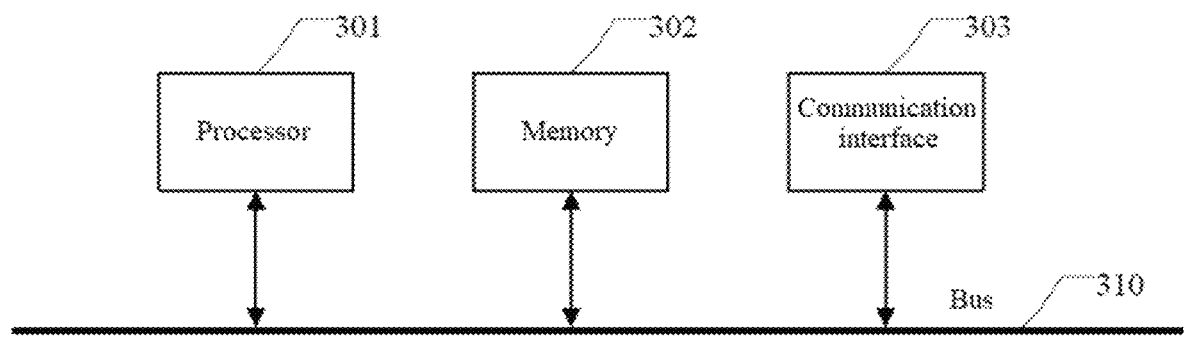
FIG. 3 is a schematic structural diagram of a charging device provided in still another example of the present application.

As shown in FIG. 3, the charging device may include a processor 301 and a memory 302 storing computer program instructions.

Specifically, the processor 301 may include a central processing unit (CPU), or an Application Specific Integrated Circuit (ASIC), or one or more integrated circuits that may be configured to implement examples of the present application.

The memory 302 may include a mass memory for data or instructions. For example and non-restrictively, the memory 302 may include a Hard Disk Drive (HDD), a floppy disk drive, a flash memory, an optical disk, a magneto-optical disk, a magnetic tape, or a Universal Serial Bus (USB) drive, or a combination of two or more of the above. The memory 302 may include a removable or non-removable (or fixed) medium, where appropriate. The memory 302 may be internal or external to an integrated gateway disaster recovery device, where appropriate. In a specific example, the memory 302 is a non-volatile solid state memory.

The memory may include a read-only memory (ROM), a random-access memory (RAM), a disk storage medium device, an optical storage medium device, a flash memory device, or an electrical, optical or other physical/tangible memory device. Therefore, usually, the memory includes one or more tangible (non-transitory) computer readable storage mediums (e.g., memory devices) encoded with software including computer-executable instructions, and the software, when executed (e.g., by one or more processors), is operable to perform the operations described with reference to the method according to an aspect of the present disclosure.

The processor 301 reads and executes the computer program instructions stored in the memory 302 to implement any one of the charging methods in the above examples.

As an example, the charging device may further include a communication interface 303 and a bus 310. As shown in FIG. 3, the processor 301, the memory 302, and the communication interface 303 complete communication with each other through the bus 310.

The communication interface 303 is mainly configured to implement communication between the modules, apparatuses, units, and/or devices in the examples of the present application.

The bus 310 includes hardware, software, or both hardware and software, and couples the components of the online data flow metering device to each other. For example and non-restrictively, the bus may include an accelerated graphics port (AGP) or other graphics buses, an enhanced industry standard architecture (EISA) bus, a front side bus (FSB), HyperTransport (HT) interconnect, an industry standard architecture (ISA) bus, infiniband interconnect, a low pin count (LPC) bus, a memory bus, a microchannel architecture (MCA) bus, a peripheral component interconnect (PCI) bus, a PCI-Express (PCI-X) bus, a serial advanced technology attachment (SATA) bus, a Video Electronics Standards Association local (VLB) bus, or other appropriate buses, or a combination of two or more of the above. The bus 310 may include one or more buses, where appropriate. While examples in the present application describe and illustrate a particular bus, the present application contemplates any appropriate bus or interconnect.

The charging device may execute a method for recognizing a multi-round dialogue intention in the examples of the present application, thereby implementing the charging method and the charging apparatus described with reference to FIG. 1 and FIG. 2.

An example of the present application further provides a computer readable storage medium storing computer program instructions thereon, where the computer program instructions, when executed by a processor, implement the method in the example shown in FIG. 1 provided in the example of the present application.

To be specific, the present application is not limited to the specific configurations and processes described above and shown in the figures. For the sake of brevity, detailed descriptions of known methods are omitted here. In the above examples, several specific steps are described and shown as examples. However, the method process of the present application is not limited to the specific steps that are described and shown, and those skilled in the art may make various alterations, modifications, and additions, or change the order between the steps after comprehending the spirit of the present application.

The functional blocks shown in the above structural block diagrams may be implemented as hardware, software, firmware, or a combination thereof. When the functional blocks are implemented as hardware, the hardware may be, for example, an electronic circuit, an Application Specific Integrated Circuit (ASIC), appropriate firmware, a plug-in, or a function card. When the functional blocks are implemented as software, elements of the present application are programs or code segments used to execute required tasks. The programs or code segments may be stored in a machine-readable medium or transmitted over a transmission medium or communication link by a data signal carried in a carrier wave. The "machine-readable medium" may include any medium that can store or transmit information. Examples of machine-readable mediums include an electronic circuit, a semiconductor memory device, a Read-Only Memory (ROM), a flash memory, an erasable ROM (EROM), a floppy disk, a CD-ROM, an optical disk, a hard disk, an optic fiber medium, a radio frequency (Radio Frequency, RF) link, and the like. The code segments may be downloaded via a computer network such as the Internet or an intranet.

It should be further noted that the exemplary examples referred to in the present application describe some methods or systems based on a series of steps or apparatuses. However, the present application is not limited to the order of the above steps, i.e., the steps may be executed in the order mentioned in the examples or in an order different from the order in the examples, or several steps may be executed concurrently.

EXAMPLES

Examples of the present application are illustrated below. The examples described below are illustrative, are merely used to explain the present application, and should not be construed as limitation on the present application. Where no specific technique or condition is specified in an example, a technique or condition described in literatures of the art or the product manual is prevailing. The reagents or instruments used without indication of manufacturers are commercially available conventional products.

Examples 1-17

Preparation of a Positive Electrode Sheet

A positive electrode active material $LiNi_{0.5}Co_{0.2}Mn_{0.3}O_2$, a lithium-supplementing material, a binder polyvinylidene fluoride (PVDF), and a conductive agent Super P were dissolved in N-methyl pyrrolidone (NMP) at a mass ratio of 80:10:5:5, and sufficiently mixed. Then, the solution was coated on the surface of an aluminum foil, dried, and cold pressed to provide the positive electrode sheet.

Preparation of a Negative Electrode Sheet

A negative electrode active material, styrene butadiene rubber SBR, and a conductive agent Super P were dissolved in deionized water at a mass ratio of 90:5:5, and sufficiently mixed. Then, the solution was coated on the surface of a copper foil, dried, and cold pressed to provide the negative electrode sheet.

Preparation of a Secondary Battery

The resulting positive electrode sheet and negative electrode sheet were wound, hot pressed, injected with liquid, and encapsulated to provide a lithium-ion secondary battery.

Chemical Formation of the Secondary Battery

The secondary battery was charged to 3.0 V at 0.1 C-rate constant current, and then charged to 3.75 V at 0.2 C-rate constant current.

Cycle of the Secondary Battery

The following cycle was performed on the secondary battery under normal conditions at 25° C.: charging to 4.40 V at a constant current of 1 C, charging to 0.05 C at a constant voltage, and discharging to 2.5 V at a constant current of 0.2 C.

Lithium Supplement of the Secondary Battery

The secondary battery in Example 5 was provided with 1 charging node, the secondary batteries in Examples 6 and 7 were provided with 2 charging nodes, and the secondary batteries in the remaining Examples were provided with 3 charging nodes. A first node was that, when the secondary battery was cycled to 500 cls, a corresponding first threshold was 93% SOH, a corresponding second threshold was 98% SOH, and a corresponding charging cut-off voltage was $V_{c1}$; a second node was that, when the secondary battery was cycled to 1,000 cls, a corresponding first threshold was 88% SOH, a corresponding second threshold was 93% SOH, and a corresponding charging cut-off voltage was $V_{c2}$; and a third node was that, when the secondary battery was cycled to 1,500 cls, a corresponding first threshold was 83% SOH, a corresponding second threshold was 85% SOH, and a corresponding charging cut-off voltage was $V_{c3}$. When the secondary battery reached a charging node, the lithium-supplementing material was activated to supplement lithium for the secondary battery. A first rate, a first temperature, and a first cut-off voltage in the lithium supplementing process are shown in Table 1. The first charging cut-off current was 0.05 C, and the second rate was 0.2 C. If the SOH of the secondary battery after lithium supplement was lower than the corresponding second threshold, the secondary battery directly entered the next charging node for lithium supplement.

Comparative Example 1

Preparation of the positive electrode sheet, preparation of the negative electrode sheet, preparation of the secondary battery, and chemical formation of the secondary battery were the same as those in Examples 1 to 17, except that: the lithium-supplementing material was not added, and in the preparation of the positive electrode sheet, the mass ratio of the positive electrode active material, the PVDF, and the conductive agent Super P was 90:5:5.

Cycle of the Secondary Battery

The following cycle was performed at 25° C.: charging to 4.40 V at a constant current of 1 C, charging to 0.05 C at a constant voltage, and discharging to 2.5 V at a constant current of 0.2 C.

Comparative Example 2

Preparation of the positive electrode sheet, preparation of the negative electrode sheet, preparation of the secondary battery, and chemical formation of the secondary battery were the same as those in Examples 1 to 17.

Lithium Supplement of the Secondary Battery

After the chemical formation process was complete, the secondary battery was further charged to 4.7 V at 0.2 C-rate constant current, then charged at a constant voltage to a cut-off current of 0.05 C; and then discharged to 2.5 V at a constant current of 0.33 C.

Cycle of the Secondary Battery

The following cycle was performed at 25° C.: charging to 4.40 V at a constant current of 1 C, charging to 0.05 C at a constant voltage, and discharging to 2.5 V at a constant current of 0.2 C.

Comparative Example 3

Preparation of the positive electrode sheet, preparation of the negative electrode sheet, preparation of the secondary battery, and chemical formation of the secondary battery were the same as those in Examples 1 to 17.

Lithium Supplement of the Secondary Battery

After the chemical formation process was complete, the secondary battery was further charged to 4.5 V at 0.2 C-rate constant current, then charged at a constant voltage to a cut-off current of 0.05 C; and then discharged to 2.5 V at a constant current of 0.33 C.

Cycle of the Secondary Battery

The following cycle was performed at 25° C.: charging to 4.40 V at a constant current of 1 C, charging to 0.05 C at a constant voltage, and discharging to 2.5 V at a constant current of 0.2 C.

The specific parameters are shown in Table 1.

Test (1) Test of a Capacity Retention Rate of the Secondary Battery

At 25° C., the secondary battery was charged to 4.4 V at a 1 C-rate constant current, and then charged to 0.05 C at a constant voltage, and a charging capacity at the moment was denoted as a first cycle charging capacity; and the secondary battery was discharged to 2.5 V at a constant current of 0.2 C, and left to stand still for 5 min, which were a cyclic charge-discharge process. A discharging capacity at the moment was denoted as a first cycle discharging capacity. The secondary battery was subjected to a cyclic charge-discharge test by the above approach, a discharging capacity after each cycle was denoted, and a capacity retention rate of the secondary battery cycled to an N-th cycle was defined as a percentage value of an N-th cycle discharging capacity divided by the first cycle discharging capacity.

Figure 4:
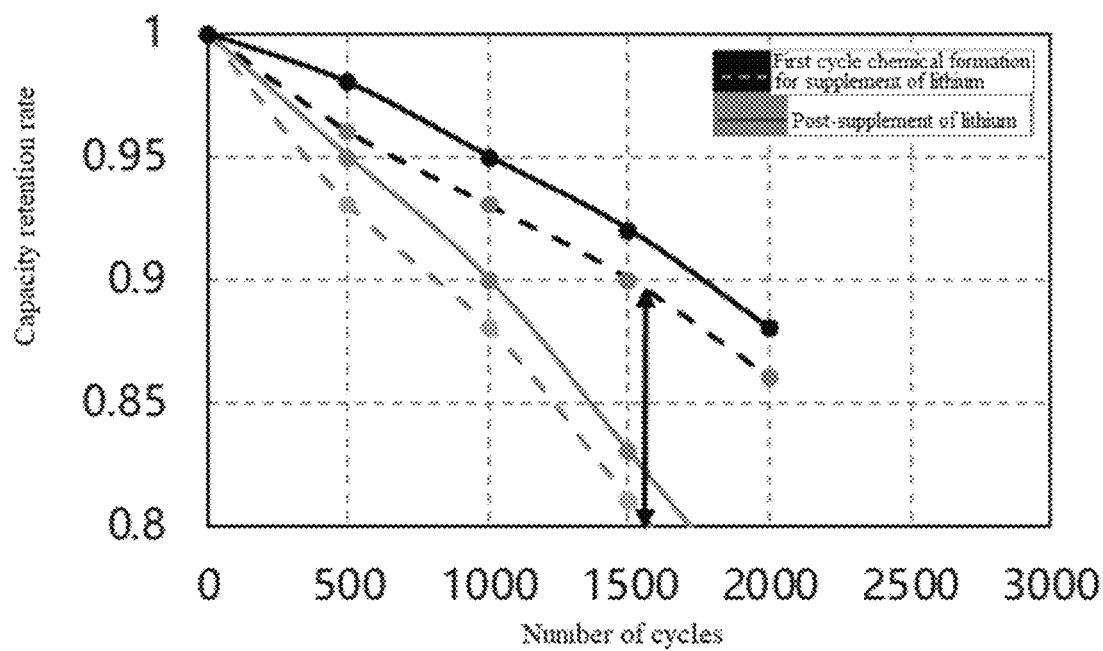
FIG. 4 is a testing diagram of 25° C. cycling capacity retention rate of a secondary battery in Example 7 and Comparative Example 3 of the present application.

The test results of Example 7 and Comparative Example 3 are shown in FIG. 4.

(2) Test of a Cycle Life of the Secondary Battery

At 25° C., the secondary battery was charged to an upper limit cut-off voltage of 4.4 V at a 1 C-rate constant current, and then charged to 0.05 C at a constant voltage, and a charging capacity at the moment was denoted as a first cycle charging capacity; and the secondary battery was discharged to 2.5 V at a constant current of 0.2 C, and then left to stand still for 5 min, which were a cyclic charge-discharge process. A discharging capacity at the moment was denoted as a first cycle discharging capacity. The secondary battery was subjected to a cyclic charge-discharge test by the above approach, a discharging capacity after each cycle was denoted until a discharging capacity fade of the secondary battery was 80% of the first cycle discharging capacity, and the number of cycles at the moment was used as the cycle life of the secondary battery.

(3) Test of an Initial Coulombic Efficiency e of a Lithium-Supplementing Material The lithium-supplementing material, a binder polyvinylidene fluoride (PVDF), and a conductive agent Super P were dissolved in N-methyl pyrrolidone (NMP) at a mass ratio of 90:5:5, and sufficiently mixed. Then, the solution was coated on the surface of an aluminum foil, dried, and cold pressed to provide a positive electrode sheet. A negative electrode active material, styrene butadiene rubber SBR, and a conductive agent Super P were dissolved in deionized water at a mass ratio of 90:5:5, and sufficiently mixed. Then, the solution was coated on the surface of a copper foil, dried, and cold pressed to provide the negative electrode sheet.

The above positive electrode sheet and the above negative electrode sheet were assembled into a secondary battery.

At 25° C., the secondary battery was charged to 4.7 V at a 0.1 C-rate constant current, and then charged to 0.05 C at a constant voltage, and a charging capacity at the moment was denoted as a first cycle charging capacity $C_0$; the secondary battery was discharged to 2.5 V at a constant current of 0.1 C, and a discharging capacity at the moment was denoted as a first cycle discharging capacity $D_0$; and the initial coulombic efficiency e of the lithium-supplementing material was $D_0/C_0$.

(4) Test Method of Lithium Stock

The lithium stock is a proportion of a lithium content in the negative electrode active material to all elements.

The dried negative electrode sheet was baked at a certain temperature for some time (for example, 400° C., 2 h), and a region was optionally selected from the baked negative electrode sheet to sample the negative electrode active material (sampling optionally by scraping powder using a blade). The negative electrode active material sample was dissolved in concentrated nitric acid, and then the solution was diluted to prepare a solution of 500 μg/mL. The diluted solution was tested by an inductively coupled plasma optical emission spectrometer (ICP-OES) in accordance with an ICP standard test process.

The test results are detailed in Table 1.

TABLE 1

Parameters and test results of Examples 1-17 and Comparative Examples 1-3

| No. | Lithium-supplementing material | e/% | w/% | Lithium stock | C.B. | First temperature | First rate | First cut-off voltage | $V_{c1}$ | $V_{c2}$ | $V_{c3}$ | Cycling life (cycles) |
|---|---|---|---|---|---|---|---|---|---|---|---|---|
| Comparative Example 1 | / | / | / | / | / | / | / | / | / | / | / | 1,500 |
| Example 1 | $Li_{1.25}Ni_{0.13}Co_{0.13}Mn_{0.525}O_2$ | 50 | 8 | 12% | 1.1 | 45° C. | 0.2 C | 4.4 V | 4.5 | 4.6 | 4.7 | 1,800 |
| Example 2 | $Li_{1.25}Ni_{0.13}Co_{0.13}Mn_{0.525}O_2$ | 40 | 8 | 15% | 1.1 | 45° C. | 0.2 C | 4.4 V | 4.5 | 4.6 | 4.7 | 1,900 |
| Example 3 | $Li_{1.25}Ni_{0.13}Co_{0.13}Mn_{0.525}O_2$ | 70 | 8 | 6% | 1.1 | 45° C. | 0.2 C | 4.4 V | 4.5 | 4.6 | 4.7 | 1,700 |
| Example 4 | $Li_{1.25}Ni_{0.13}Co_{0.13}Mn_{0.525}O_2$ | 80 | 8 | 2% | 1.1 | 45° C. | 0.2 C | 4.4 V | 4.5 | 4.6 | 4.7 | 1,650 |

TABLE 1-continued

Parameters and test results of Examples 1-17 and Comparative Examples 1-3

| No. | Lithium-supplementing material | e/% | w/% | Lithium stock | C.B. | First temperature | First rate | First cut-off voltage | $V_{c1}$ | $V_{c2}$ | $V_{c3}$ | Cycling life (cycles) |
|---|---|---|---|---|---|---|---|---|---|---|---|---|
| Comparative Example 2 | $Li_{1.25}Ni_{0.13}Co_{0.13}Mn_{0.525}O_2$ | 50 | 8 | 10% | 1.1 | / | / | / | / | / | / | 1,600 |
| Example 5 | $Li_{1.25}Ni_{0.13}Co_{0.13}Mn_{0.525}O_2$ | 50 | 8 | 10% | 1.1 | 45° C. | 0.2 C | 4.4 V | 4.7 | / | / | 1,720 |
| Example 6 | $Li_{1.25}Ni_{0.13}Co_{0.13}Mn_{0.525}O_2$ | 50 | 8 | 11% | 1.1 | 45° C. | 0.2 C | 4.4 V | 4.55 | 4.7 | / | 1,760 |
| Comparative Example 3 | $Li_{1.25}Ni_{0.13}Co_{0.13}Mn_{0.525}O_2$ | 50 | 8 | 8% | 1.1 | / | / | / | / | / | / | 1,550 |
| Example 7 | $Li_{1.25}Ni_{0.13}Co_{0.13}Mn_{0.525}O_2$ | 50 | 8 | 10% | 1.1 | 45° C. | 0.2 C | 4.4 V | 4.5 | 4.6 | / | 1,700 |
| Example 8 | $Li_{1.25}Ni_{0.13}Co_{0.13}Mn_{0.525}O_2$ | 50 | 8 | 12% | 1.1 | 35° C. | 0.2 C | 4.4 V | 4.5 | 4.6 | 4.7 | 1,780 |
| Example 9 | $Li_{1.25}Ni_{0.13}Co_{0.13}Mn_{0.525}O_2$ | 50 | 8 | 12% | 1.1 | 20° C. | 0.2 C | 4.4 V | 4.5 | 4.6 | 4.7 | 1,760 |
| Example 10 | $Li_{1.25}Ni_{0.13}Co_{0.13}Mn_{0.525}O_2$ | 50 | 8 | 12% | 1.1 | 45° C. | 0.4 C | 4.4 V | 4.5 | 4.6 | 4.7 | 1,790 |
| Example 11 | $Li_{1.25}Ni_{0.13}Co_{0.13}Mn_{0.525}O_2$ | 50 | 8 | 12% | 1.1 | 45° C. | 1 C | 4.4 V | 4.5 | 4.6 | 4.7 | 1,780 |
| Example 12 | $Li_{1.25}Ni_{0.13}Co_{0.13}Mn_{0.525}O_2$ | 50 | 15 | 18% | 1.1 | 45° C. | 0.2 C | 4.4 V | 4.5 | 4.6 | 4.7 | 2,000 |
| Example 13 | $Li_{1.25}Ni_{0.13}Co_{0.13}Mn_{0.525}O_2$ | 50 | 25 | 25% | 1.1 | 45° C. | 0.2 C | 4.4 V | 4.5 | 4.6 | 4.7 | 1,650 |
| Example 14 | $Li_{1.25}Ni_{0.13}Co_{0.13}Mn_{0.525}O_3$ | 50 | 8 | 12% | 1.14 | 45° C. | 0.2 C | 4.4 V | 4.5 | 4.6 | 4.7 | 1,800 |
| Example 15 | $Li_{1.25}Ni_{0.13}Co_{0.13}Mn_{0.525}O_4$ | 50 | 8 | 12% | 1.05 | 45° C. | 0.2 C | 4.4 V | 4.5 | 4.6 | 4.7 | 1,750 |
| Example 16 | $Li_{1.21}Ni_{0.13}Co_{0.13}Mn_{0.535}O_2$ | 50 | 8 | 15% | 1.1 | 45 | 0.2 C | 4.4 V | 4.5 V | 4.6 | 4.7 | 1,700 |
| Example 17 | $Li_{1.29}Ni_{0.13}Co_{0.13}Mn_{0.515}O_2$ | 50 | 8 | 18% | 1.1 | 45 | 0.2 C | 4.4 V | 4.5 V | 4.6 | 4.7 | 1,900 |

As can be seen from the above test results, in Examples 1 to 24, by post-supplement of lithium using the charging method provided in the present application, the cycle life is improved to some extent. In Comparative Example 2 and Example 5, lithium was supplemented only once at an equal lithium-supplementing voltage, and the only difference was that in Comparative Example 2, the lithium-supplementing material was activated after chemical formation of the secondary battery, while in Example 5, lithium was post-supplemented in the cycling process, but the secondary battery in Example 5 has a significantly longer cycle life than the secondary battery in Comparative Example 2. In addition, the type of the lithium-supplementing material, the initial coulombic efficiency e, the mass proportion w of the lithium-supplementing material, the first temperature, the first rate, and the C.B. are also important factors that affect the cycle life of the secondary battery.

The above description merely provides specific embodiments of the present application. Those skilled in the art can clearly understand that, for convenience and simplicity of description, corresponding processes in the above method examples may be referred to for specific working process of the above described systems, modules and units. The description will not be repeated here. It should be understood that the scope of protection of the present application is not limited to the specific embodiments. Any person skilled in the technical field may easily conceive of various equivalent modifications or replacements within the technical scope disclosed in the present application. All these modifications or replacements should be encompassed within the scope of the present application.

The invention claimed is:

1. A charging method for a secondary battery, the secondary battery comprising a lithium-supplementing material, the method comprising:
   acquiring a first state of health of the secondary battery in response to the secondary battery being at a preset charging node;
   activating the lithium-supplementing material in response to the first state of health being less than or equal to a first threshold, to supplement lithium for the secondary battery;
   performing a charging process on the secondary battery;
   determining a second state of health of the secondary battery based on a working parameter of the secondary battery in the charging process; and
   charging the secondary battery in response to the second state of health being greater than a second threshold.

2. The method according to claim 1, further comprising, in response to the second state of health being less than or equal to the second threshold:
   determining that the secondary battery is at a next charging node after the preset charging node; and
   activating the lithium-supplementing material to supplement lithium for the secondary battery.

3. The method according to claim 1, wherein activating the lithium-supplementing material to supplement lithium for the secondary battery comprises:
   setting an overcharge protection voltage as a lithium-supplementing voltage, wherein the lithium-supplementing voltage is a charging cut-off voltage corresponding to a charging node where the secondary battery is at;
   charging the secondary battery to the lithium-supplementing voltage at a constant current of a preset first rate;
   charging the secondary battery to a preset charging cut-off current at a constant voltage equal to the lithium-supplementing voltage; and
   discharging the second battery to a preset cut-off voltage at a constant current of a preset second rate.

4. The method according to claim 3, further comprising:
   after setting the overcharge protection voltage as the lithium-supplementing voltage, heating the secondary battery to a first temperature; and
   before performing the charging process on the secondary battery, controlling a temperature of the secondary battery to be a second temperature.

5. The method according to claim 4, wherein the first temperature is in a range from 25° C. to 60° C., and the second temperature is in a range from 20° C. to 30° C.

6. The method according to claim 3, wherein the first rate is in a range from 0.1 C to 1 C.

7. The method according to claim 3, wherein the first rate is in a range from 0.1 C to 0.5 C.

8. The method according to claim 3, wherein:
   the preset charging node is one of a plurality of charging nodes set based on a number of cycles and a cycling capacity of the secondary battery;

the first threshold is one of a plurality of first thresholds set based on the number of cycles and the cycling capacity of the secondary battery, the plurality of first thresholds and the plurality of charging nodes being in a one-to-one correspondence relation;

the second threshold is one of a plurality of second thresholds in a one-to-one correspondence with the plurality of charging nodes; and the charging cut-off voltage is one of a plurality of charging cut-off voltages set based on the plurality of second thresholds, the plurality of charging cut-off voltages and the plurality of charging nodes being in a one-to-one correspondence relation.

9. The method according to claim 3, wherein the charging cut-off voltage is in a range from 4.4 V to 4.8 V.

10. The method according to claim 1, wherein the charging process comprises:

discharging the second battery to a preset first cut-off voltage at a constant current of a preset first rate;

charging the secondary battery to a preset second cut-off voltage at a constant current of a preset second rate;

charging the secondary battery to a preset charging cut-off current at a constant voltage equal to the second cut-off voltage; and discharging the second battery to the first cut-off voltage at a constant current of the preset first rate.

11. The method according to claim 1, wherein charging the secondary battery in response to the second state of health being greater than the second threshold comprises cyclically executing following processes on the secondary battery in response to the second threshold being greater than the second threshold, until a preset stop condition is satisfied:

charging the secondary battery to a preset first cut-off voltage at a constant current of a preset first rate;

charging the secondary battery to a preset charging cut-off current at a constant voltage equal to the first cut-off voltage; and discharging the second battery to a preset second cut-off voltage at a constant current of a preset third rate;

wherein the preset stop condition includes:

a number of times that the secondary battery is discharged to the second cut-off voltage reaches a preset threshold number of times, or the secondary battery is at the preset charging node.

12. The method according to claim 1, wherein:

the lithium-supplementing material has a molecular formula of $Li_{1+x}M_yO_z$, element M being selected from at least one of Ni or Co and at least one of Mn, Mo, Ru, or Ti, $0.05 \leq x \leq 0.5$, $0.10 \leq y \leq 0.95$, and $2 \leq z < 4$; and a mass proportion w of the lithium-supplementing material in a total mass of a positive electrode sheet of the secondary battery satisfies: $0 \leq w \leq 0.35$.

13. The method according to claim 1, wherein an initial coulombic efficiency e of the lithium-supplementing material satisfies: $0.2 \leq e \leq 0.9$.

14. The method according to claim 1, wherein a ratio of a charging capacity of a negative electrode active material of the secondary battery to a charging capacity of a positive electrode active material of the secondary battery is larger than or equal to 1.05 and smaller than or equal to 1.15.

15. The method according to claim 1, wherein the secondary battery comprises a gas-permeable top cover.

16. A charging device, comprising:
a processor; and
a memory storing computer program instructions that, when executed, cause the processor to:
    acquire a first state of health of a secondary battery in response to the secondary battery being at a preset charging node;
    control to activate a lithium-supplementing material of the secondary battery in response to the first state of health being less than or equal to a first threshold, to supplement lithium for the secondary battery;
    control to perform a charging process on the secondary battery;
    determine a second state of health of the secondary battery based on a working parameter of the secondary battery in the charging process; and
    control to charge the secondary battery in response to the second state of health being greater than a second threshold.

17. The device according to claim 16, wherein the computer program instructions further cause the processor to, in response to the second state of health being less than or equal to the second threshold:
    determine that the secondary battery is at a next charging node after the preset charging node; and
    control to activate the lithium-supplementing material to supplement lithium for the secondary battery.

18. The device according to claim 16, wherein the computer program instructions further cause the processor to:
    set an overcharge protection voltage as a lithium-supplementing voltage, wherein the lithium-supplementing voltage is a charging cut-off voltage corresponding to a charging node where the secondary battery is at;
    control to charge the secondary battery to the lithium-supplementing voltage at a constant current of a preset first rate;
    control to charge the secondary battery to a preset charging cut-off current at a constant voltage equal to the lithium-supplementing voltage; and
    control to discharge the second battery to a preset cut-off voltage at a constant current of a preset second rate.

19. The device according to claim 18, wherein the computer program instructions further cause the processor to:
    after the overcharge protection voltage is set as the lithium-supplementing voltage, control a temperature of the secondary battery to be a first temperature; and
    before control to perform the charging process on the secondary battery, control a temperature of the secondary battery to be a second temperature.

20. A non-transitory computer-readable storage medium, storing computer program instructions that, when executed by a processor, cause the processor to:
    acquire a first state of health of a secondary battery in response to the secondary battery being at a preset charging node;
    control to activate a lithium-supplementing material of the secondary battery in response to the first state of health being less than or equal to a first threshold, to supplement lithium for the secondary battery;
    control to perform a charging process on the secondary battery;
    determine a second state of health of the secondary battery based on a working parameter of the secondary battery in the charging process; and
    control a charging circuit to charge the secondary battery in response to the second state of health being greater than a second threshold.

* * * * *